T. FINNEGAN.
STOCK TANK HEATER.
APPLICATION FILED JAN. 31, 1913.
1,079,595.
Patented Nov. 25, 1913.
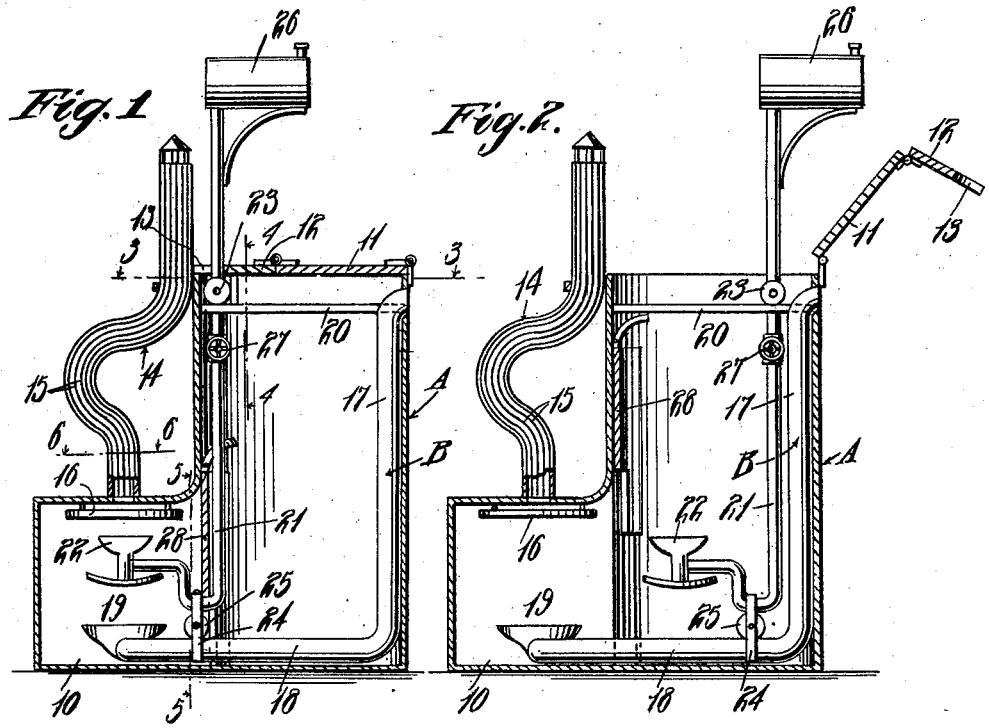
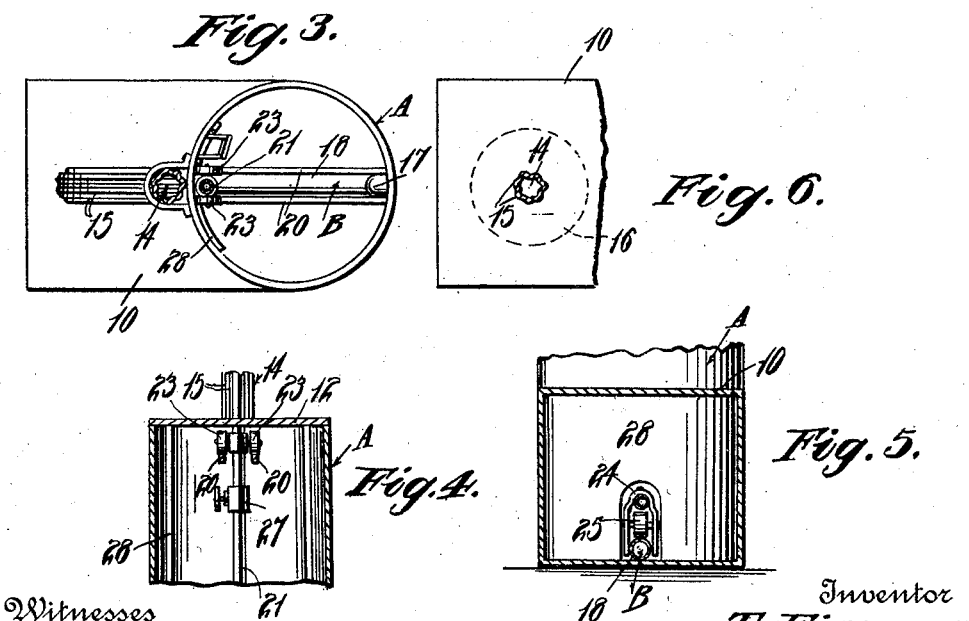
Witnesses
W. E. Fielding
Henry T. Bright
Inventor
T. Finnegan
By Chandler & Chandler
Attorneys

UNITED STATES PATENT OFFICE.

THOMAS FINNEGAN, OF SWEA CITY, IOWA.

STOCK-TANK HEATER.

1,079,595.  Specification of Letters Patent.  Patented Nov. 25, 1913.

Application filed January 31, 1913. Serial No. 745,465.

*To all whom it may concern:*

Be it known that I, THOMAS FINNEGAN, a citizen of the United States, residing at Swea City, in the county of Kossuth, State of Iowa, have invented certain new and useful Improvements in Stock-Tank Heaters; and I do hereby declare the following to be a full, clear, and exact description of the invention, such as will enable others skilled in the art to which it appertains to make and use the same.

This invention relates to stock tank heaters.

The object of the invention resides in the provision of a device of the character named which will serve to efficiently prevent the water in a stock tank from freezing and which will be simple in construction, durable, easily lighted and extinguished and which may be manufactured at a comparatively small cost.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a vertical section through a stock tank heater constructed in accordance with the invention; Fig. 2, a view similar to Fig. 1 showing the burner element moved to a position where same can be easily lighted through the opening in the top of the heater casing; Fig. 3, a section on the line 3—3 of Fig. 1; Fig. 4, a section on the line 4—4 of Fig. 1; Fig. 5, a section on the line 5—5 of Fig. 1; and Fig. 6, a section on the line 6—6 of Fig. 1.

Referring to the drawings the heater is shown as comprising a casing A having a lateral extension 10 at its lower end. The upper end of the casing A is open and adapted to be closed through the medium of a hinged door 11. The free end of this door 11 terminates in a hinged section 12 having a recess 13 therein. Rising from the top of the lateral extension 10 and communicating with the interior of the casing is a crooked products of combustion discharge pipe 14, the wall of which is provided with a plurality of longitudinal corrugations 15 whereby the heating surface of said pipe is materially increased. Suspended from the top of the lateral extension 10 directly beneath the lower end of the discharge pipe 14 is a flame spreader 16.

Disposed within the casing A is an air supply pipe B which includes a vertical portion 17 and a horizontal portion 18, the free end of the former terminating flush with the top of the casing, while the free end of the latter extends into the lateral extension 10 and terminates in an upwardly directed flared mouth 19 disposed directly beneath the flame spreader 16.

Mounted transversely of the casing A adjacent the upper end of the latter are parallel bars 20—20. Extending between the bars 20 vertically of the casing A is a gasolene supply pipe 21 the lower end of which is directed toward the lateral extension 10 and terminates in a burner 22 adapted for interposition between the mouth 19 and the flame spreader 16, said burner being efficiently supplied with air from the flared mouth 19. Journaled on each side of the pipe 21 are rollers 23 which rest respectively upon the bars 20. Secured to the lower end of the pipe 21 is a bracket 24 in which is journaled a roller 25 which engages the horizontal portion 18 of the air supply pipe B. Suitably supported on the upper end of the pipe 21 is a gasolene tank 26 from which the gasolene flows by gravity through the pipe 21 to the burner 22, such flow being controlled by a valve 27 disposed in the pipe 21 just beneath the bars 20.

Slidably mounted for vertical movement in the casing A between the lateral extension 10 and the main body portion of the casing A is a door 28 which serves to shield the pipe 21 from the direct effect of the flame issuing from the burner 22.

In the use of the device the casing A is placed in a stock tank and the cover 11 opened. The gasolene tank 26, pipe 21 and burner 22 are then moved transversely of the casing A, the rollers 23 and 25 serving to assist and guide the parts in such movement. The gasolene is then turned into the pipe 21 through the medium of the valve 27 and the burner lighted, after which the tank 26, pipe 21 and burner 22 are returned to the position shown in Fig. 1. The cover 11 is then moved to closed position, the pipe 21 entering the recess 13. After this is done the heat generated by the burner 22 will maintain the water in the tank at a relatively high temperature and prevent freezing.

What I claim is:—

1. In a stock tank heater, the combination of a casing having an open upper end and a lateral extension at its lower end, a products of combustion discharge pipe rising from the top of said lateral extension and communicating with the interior of the casing, a fuel supply pipe extending into said casing and disposed vertically of the latter, said supply pipe having its lower end directed toward the lateral extension of the casing and terminating in the burner, means for adjusting said fuel supply pipe and burner transversely of the casing, and means for supplying air to the interior of the casing at a point directly beneath the lower end of the products of combustion discharge pipe.

2. In a stock tank heater, the combination of a casing having an open upper end and a lateral extension at its lower end, a products of combustion discharge pipe rising from the top of the lateral extension and communicating with the interior of the casing, an air supply pipe disposed within the casing and comprising vertical and horizontal portions, the latter of which projects into the lateral extension, parallel bars arranged transversely of the casing adjacent the open end of the latter, a fuel supply pipe extending between said bars and having its lower end directed toward said lateral extension of the casing and terminating in a burner, rollers journaled on said fuel supply pipe engaging respectively the upper sides of said bars, a bracket on the lower end of said fuel supply pipe, a roller journaled in said bracket and engaging the horizontal portion of the air supply pipe, whereby the fuel supply pipe may be adjusted transversely of the casing, and a fuel tank mounted on the upper end of the fuel supply pipe.

In testimony whereof, I affix my signature, in the presence of two witnesses.

THOMAS FINNEGAN.

Witnesses:
W. H. CUNNINGHAM,
C. A. PEARSON.

---

Copies of this patent may be obtained for five cents each, by addressing the "Commissioner of Patents, Washington, D. C."